(12) United States Patent
Hwang et al.

(10) Patent No.: US 10,158,805 B2
(45) Date of Patent: Dec. 18, 2018

(54) METHOD OF SIMULTANEOUSLY DISPLAYING IMAGES FROM A PLURALITY OF CAMERAS AND ELECTRONIC DEVICE ADAPTED THERETO

(71) Applicant: Samsung Electronics Co., Ltd., Gyeonggi-do (KR)

(72) Inventors: Minkyung Hwang, Seoul (KR); Jeonghyun Pang, Gyeonggi-do (KR); Saemee Yim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/683,615

(22) Filed: Apr. 10, 2015

(65) Prior Publication Data
US 2015/0296145 A1    Oct. 15, 2015

(30) Foreign Application Priority Data

Apr. 11, 2014 (KR) .................. 10-2014-0043389

(51) Int. Cl.
| | |
|---|---|
| H04N 5/232 | (2006.01) |
| H04N 5/247 | (2006.01) |
| H04N 5/225 | (2006.01) |
| H04N 1/00 | (2006.01) |
| H04N 7/14 | (2006.01) |
| G06T 11/60 | (2006.01) |

(52) U.S. Cl.
CPC ..... *H04N 5/23293* (2013.01); *H04N 1/00456* (2013.01); *H04N 5/2258* (2013.01); *H04N 5/247* (2013.01); *G06T 11/60* (2013.01); *H04N 7/142* (2013.01)

(58) Field of Classification Search
None
See application file for complete search history.

(56) References Cited

U.S. PATENT DOCUMENTS

| | | | | |
|---|---|---|---|---|
| 2006/0256134 A1* | 11/2006 | Widdowson | ............ | G06T 11/60 345/629 |
| 2007/0253028 A1* | 11/2007 | Widdowson | ............ | G06T 11/60 358/1.18 |
| 2008/0025566 A1* | 1/2008 | Widdowson | ........ | G06F 3/04845 382/103 |
| 2008/0101761 A1* | 5/2008 | Widdowson | ......... | H04N 1/3872 386/248 |

(Continued)

FOREIGN PATENT DOCUMENTS

KR    10-2011-0093362 A    8/2011

*Primary Examiner* — Justin P. Misleh
(74) *Attorney, Agent, or Firm* — Cha & Reiter, LLC.

(57) ABSTRACT

An image display method and an electronic device adapted thereto are disclosed herein. The electronic device includes a plurality of cameras, a display for displaying one or more preview images captured by at least one of the plurality of cameras, and a controller, which may execute the method including displaying a first layout and a second layout, the first layout including a first subject captured within a first image from a first camera, and the second layout including a second subject captured within a second image from a second camera, and adjusting at least one of the displayed first and second layouts, according to attributes of each of the first subject and the second subject.

16 Claims, 12 Drawing Sheets

(56) References Cited

U.S. PATENT DOCUMENTS

| | | | |
|---|---|---|---|
| 2008/0123993 A1* | 5/2008 | Widdowson | G06T 11/60 382/284 |
| 2010/0333004 A1 | 12/2010 | Kristiansen et al. | |
| 2012/0105579 A1* | 5/2012 | Jeon | H04N 5/2258 348/38 |
| 2012/0218431 A1* | 8/2012 | Matsuoto | H04N 5/2258 348/218.1 |
| 2013/0120602 A1* | 5/2013 | Huang | H04M 1/72522 348/218.1 |
| 2013/0235223 A1* | 9/2013 | Park | H04N 5/23222 348/218.1 |
| 2015/0049234 A1* | 2/2015 | Jung | H04N 5/2258 348/333.05 |
| 2015/0124125 A1* | 5/2015 | Kim | H04N 5/2628 348/239 |
| 2015/0207970 A1* | 7/2015 | Min | H04N 5/2258 348/14.07 |

\* cited by examiner

| IMAGE OBTAINING MODULE | ~161 |

| IMAGE OUTPUT MODULE | ~163 |

FIG. 7
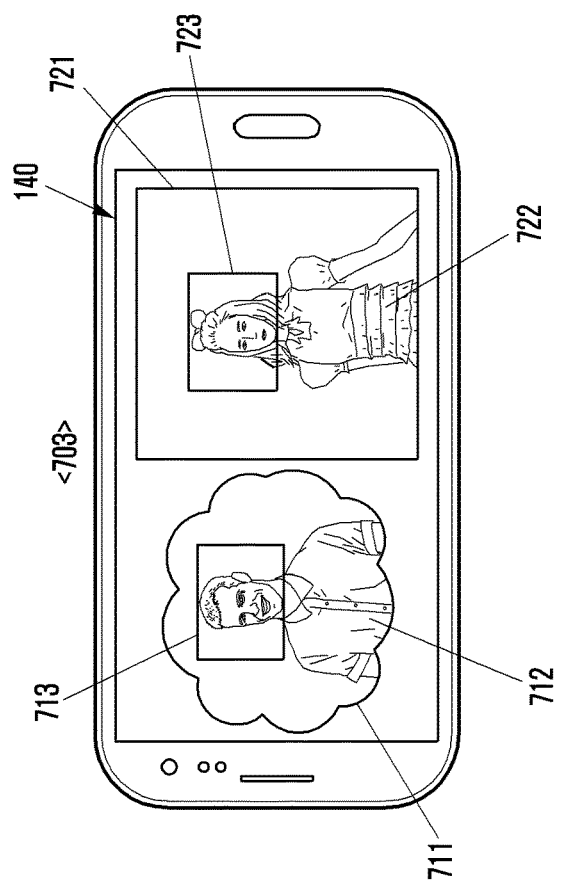
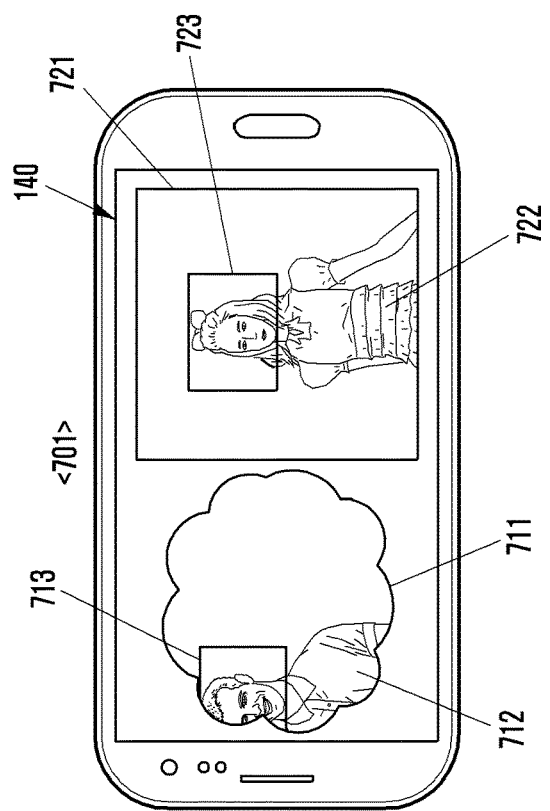

METHOD OF SIMULTANEOUSLY DISPLAYING IMAGES FROM A PLURALITY OF CAMERAS AND ELECTRONIC DEVICE ADAPTED THERETO

CROSS REFERENCE TO RELATED APPLICATION

This application claims the benefit under 35 U.S.C. § 119(a) of a Korean patent application filed on Apr. 11, 2014 in the Korean Intellectual Property Office and assigned Serial No. 10-2014-0043389, the entire disclosure of which is hereby incorporated by reference.

TECHNICAL FIELD

The present disclosure relates to a method of displaying images obtained by cameras and an electronic device adapted to execute the method.

BACKGROUND

With the development of hardware and software technology, the performance of electronic devices has rapidly advanced. Most recent electronic devices have been developed to be very compact in size, while still providing ample functionality, including communication functions.

Electronic devices include a camera, and may perform storage or transmission of images obtained by the camera. In recent years, electronic devices have been developed to be equipped with a plurality of cameras. Conventional electronic devices with a plurality of cameras may execute camera functions such as taking images, making video calls, etc.

Although conventional electronic devices are equipped with a plurality of cameras and the camera-related functions, they do not control the plurality of cameras simultaneously, but only one at a time. For example, during a video call, conventional electronic devices support only the video call function, which is only one of a number of camera-related functions. Similarly, conventional electronic devices support only an image-capture function while photographing images with a camera of the electric device.

SUMMARY

The present disclosure provides an apparatus and method of operating a number of cameras and displaying the captured photographs in a preset form.

The present disclosure further provides an apparatus and method of allowing users to easily take or edit images in a system with a dual view function or multi view function.

In accordance with one example embodiment of the present disclosure, the present invention provides an electronic device, including a plurality of cameras, a display for displaying one or more preview images captured by at least one of the plurality of cameras, and a controller. The controller displays a first layout and a second layout, the first layout including a first subject captured within a first image from a first camera, and the second layout including a second subject captured within a second image from a second camera, and adjusting at least one of the displayed first and second layouts, according to attributes of each of the first subject and the second subject.

In accordance with one example embodiment of the present disclosure, the present invention provides a method of displaying images, including receiving one or more preview images from a plurality of cameras, and displaying on a display a first layout and a second layout, the first layout including a first subject captured within a first image from a first camera, and the second layout including a second subject captured within a second image from a second camera, and adjusting at least one of the displayed first layout and second layout according to attributes each of the first subject and the second subject.

BRIEF DESCRIPTION OF THE DRAWINGS

The disclosure will become more apparent from the following detailed description in conjunction with the accompanying drawings, in which:

FIG. 2 is a detailed view of a control module according to an embodiment of the present disclosure;

FIG. 7 illustrates example screens displaying multiple images for altering a position of a subject, according to an embodiment of the present disclosure;

DETAILED DESCRIPTION

Figure 1:
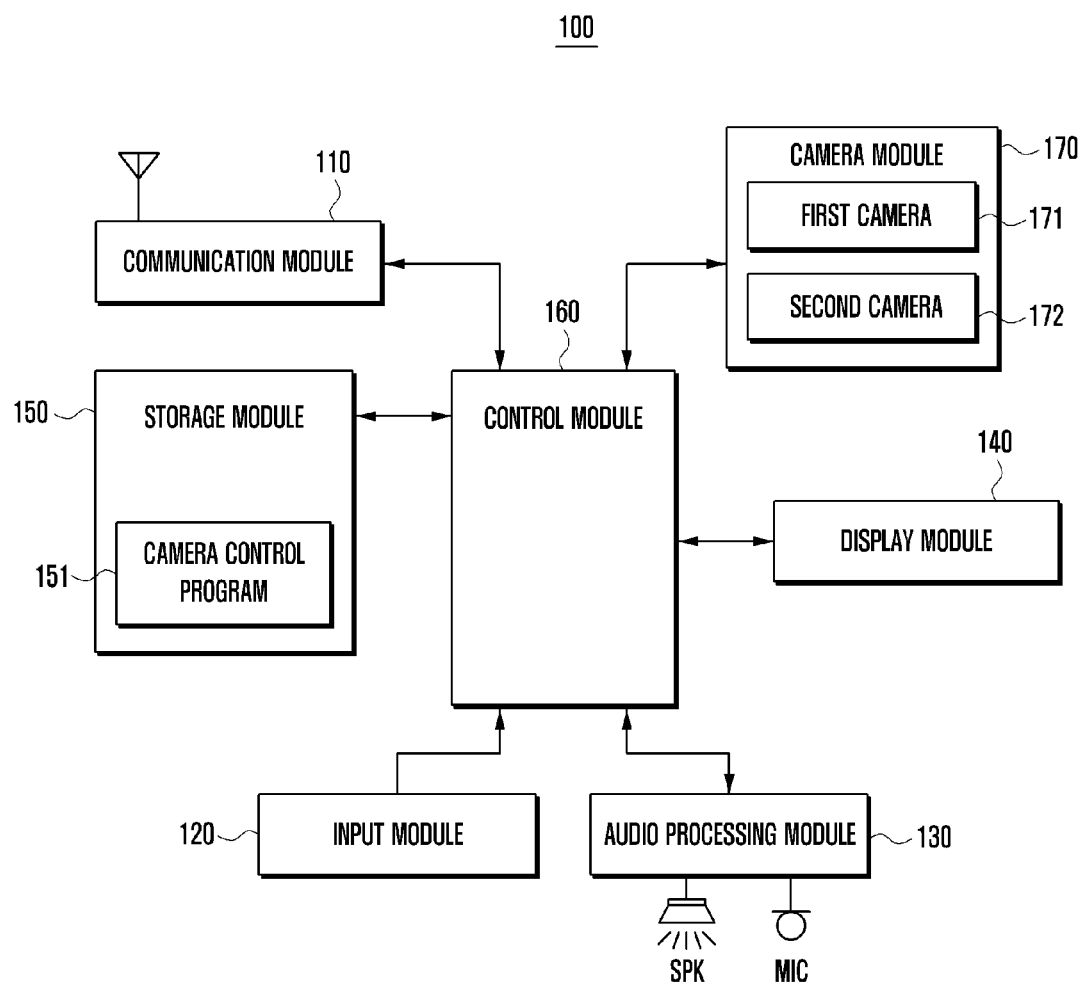
FIG. 1 is a schematic block diagram of an electronic device according to an embodiment of the present disclosure.

Hereinafter, the present disclosure will be described in detail with reference to the accompanying drawings. It will be easily appreciated to those skilled in the art that various modifications, additions and substitutions are possible from the embodiments of the invention that are illustrated and described in detail in the following description, and the scope of the invention should not be limited to the following embodiments. The embodiments of the present disclosure are provided such that those skilled in the art completely understand the invention. It should be understood that the invention may include all modifications and/or equivalents and/or substations included in the idea and technical scope of the present disclosure. In the drawings, the same or similar elements are denoted by the same reference numerals even though they are depicted in different drawings.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of the addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

In the case where according to which a component is referred to as being "connected" or "accessed" to other component, it should be understood that not only the component is directly connected or accessed to the other component, but also another component may exist between the component and the other component. Meanwhile, in the case where according to which a component is referred to as being "directly connected" or "directly accessed" to other component, it should be understood that there is no component therebetween.

The terms used in the present disclosure are only used to describe specific various embodiments, and are not intended to limit the present disclosure. Singular forms are intended to include plural forms unless the context clearly indicates otherwise.

Unless otherwise defined, all terms including technical and/or scientific terms used herein have the same meaning as commonly understood by one of ordinary skill in the art to which the invention pertains. In addition, unless otherwise defined, all terms defined in generally used dictionaries may not be overly interpreted.

An electronic device according to the present disclosure may be a device with a camera. For example, the electronic device may include one or more of the following: a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a wearable device, etc. Examples of a wearable device are a head-mounted-device (HMD) (e.g., electronic eyeglasses), electronic clothing, an electronic bracelet, an electronic necklace, an electronic accessory, an electronic tattoo, a smart watch, etc.

In addition, an electronic device according to an embodiment of the present disclosure may be smart home appliances with a camera. Smart home appliances may include one or more of the following: a television (TV), a Digital Video Disk (DVD) player, an audio system, a refrigerator, an air-conditioner, a cleaning device, an oven, a microwave oven, a washing machine, an air cleaner, a set-top box, a TV box (e.g., Samsung HomeSync™ Apple TV™, or Google TV™), a game console, an electronic dictionary, an electronic key, a camcorder, an electronic album, etc.

An electronic device according to embodiments of the present disclosure may include one or more of the following: various medical devices (e.g., Magnetic Resonance Angiography (MRA), Magnetic Resonance Imaging (MRI), Computed Tomography (CT), a scanning machine, an ultrasonic wave device, etc.), a navigation device, a Global Positioning System (GPS) receiver, an Event Data Recorder (EDR), a Flight Data Recorder (FDR), a vehicle infotainment device, electronic equipment for ships (e.g., navigation equipment, gyrocompass, etc.), avionics, a security device, a head unit for vehicle, an industrial or home robot, an automatic teller's machine (ATM), a point of sales (POS) system, etc.

An electronic device according to embodiments of the present disclosure may include one or more of the following: furniture or a portion of a building/structure, an electronic board, an electronic signature receiving device, a projector, various measuring instruments (e.g., a water meter, an electric meter, a gas meter and a wave meter), etc., which have a camera, respectively. An electronic device according to the present disclosure may also include a combination of the devices listed above. In addition, an electronic device according to the present disclosure may be a flexible device. It is obvious to those skilled in the art that the electronic device according to the present disclosure is not limited to the aforementioned devices.

Hereinafter, electronic devices according the embodiments of the present disclosure are described in detail with reference to the accompanying drawings. In the description, the term a 'user' is referred to as a person or a device that uses an electronic device, e.g., an artificial intelligent electronic device.

FIG. 1 is a schematic block diagram of an electronic device according to an embodiment of the present disclosure.

Referring to FIG. 1, the electronic device 100 includes a communication module 110, an input module 120, an audio processing module 130, a display module 140, a storage module 150, a camera module 170 and a control module 160 (e.g., a controller, a control unit, a processor, etc.).

According to the embodiments of the present disclosure, the electronic device 100 obtains images through a number of cameras (a number of camera's images) and outputs the images through a display module 140. The electronic device 100 automatically adjusts a layout on which a corresponding camera's image will be output, according to a display characteristic of camera's images. The electronic device 100 may also adjust a layout outputting camera's image according to a user's option. The electronic device 100 adaptively outputs a number of camera's images to a multi-view screen, according to an image acquisition status or image display status. For example, when the electronic device 100 estimates that focuses of images will be superimposed (e.g., overlapping, or obstructing, covering, etc.) on a multi-view screen, it may adjust a screen layout so that focus superimposition cannot be created. In another embodiment, the electronic device 100 detects the size and position of images on a multi-view screen and may adjust a screen layout so that the images can be displayed in optimized size and position. In another embodiment, the electronic device 100 may adaptively adjust a screen layout, depending on whether to detect a subject of images on a multi-view screen.

The communication module 110 supports a communication function of the electronic device 100. The communication module 110 includes one or more modules for performing wireless communication between the electronic device 100 and wireless communication systems or between the electronic device 100 and networks connected with other devices. For example, the communication module 110 may be implemented with a mobile communication module, a Wireless Local Area Network (WLAN) module, a short range communication module, a position estimation module, a broadcast receiving module, etc. The communication module 110 transmits/receives radio frequency (RF) signals to/from one or more of the following: a base station, external terminals, various types of servers (e.g., an integration server, a provider server, a content server), etc. The RF signals include signals and data related to voice call, video call, text messages, multimedia messages, etc. In an embodiment, the communication module 110 transmits part of images obtained by the camera module 170 to other electronic devices. The communication module 110 also receives images from other electronic devices. It should be understood that, when the electronic device 100 is implemented not to support a communication function, it may not include the communication module 110.

The input module 120 creates input signals to the electronic device 100. The input module 120 includes mechanical keys, such as one or more key buttons, a home key, side keys, etc. The input module 120 includes a touch type input system such as a touch pad, a touch panel, a touch sheet, etc. The touch type input system refers to a device that creates input signals by touches of the user's hand, a digital pen, a pen shaped object. When the display module 140 is implemented with a touch screen, it may serve as an input system performing input functions of the input module 120.

The input module 120 creates input signals related to cameras, e.g., options for selecting modes, such as a signal view mode, a multi-view mode, etc. The input module 120 creates an input signal for activating one or more cameras included in the camera module 170, an input signal for instructing the activated camera(s) to obtain images, etc. The input module 120 creates an input signal for adjusting a layout, according to a user's manual operation (a manual mode), in a multi-view mode.

The audio processing module 130 collects and/or outputs audio signals related to the operations of the electronic device 100. For example, the audio processing module 130 outputs audio signals stored in the storage module 150 or audio signals transmitted from other electronic devices. While the electronic device 100 is making a communication, the audio processing module 130 may collect the audio signals according to an audio signal collecting request. While the camera module 170 is operating, the audio processing module 130 outputs: a sound effect or voice for guiding an activation of the camera module 170; a sound effect or voice for guiding a collection of images by the camera module 170; a voice for guiding modes, such as a single view mode, a multi-view mode, etc.; a sound effect or voice for guiding a layout adjustment in a multi-view mode; etc. The audio processing module 130 may not output audio signals listed above according to a user's settings.

The display module 140 outputs various screens according to the operations of the electronic device 100, a sleep mode screen, a lock screen when waking up from a sleep mode, a standby mode screen, an application screen, etc. The display module 140 also outputs various screens related to the operations of the camera module 170, e.g., an option screen for selecting a single view mode or a multi-view mode, a multi-view screen including a number of layouts in a multi-view mode, etc. In embodiments of the present disclosure, the display module 140 displays one or more preview images, obtained by a number of cameras, on layout(s) correspondingly, respectively. During the multi-view mode, the display module 140 displays a pop-up window or a text message informing layout adjustment, a multi-view screen where a layout is adjusted according to the option of the layout adjustment, etc. A detailed description about various screen interfaces of the display module 140 will be provided later referring to the accompany drawings. The display module 140 may be implemented with a touch screen that supports an input function. In that case, the display module 140 includes a display panel, and a touch panel or touch sheet.

The storage module 150 stores programs and data utilized for the operation of the electronic device 100, data created or received when applications operate, etc. The storage module 150 includes a camera control program 151.

The camera control program 151 relates to the controlling of the camera module 170. In embodiments of the present disclosure, the camera control program 151 includes: routines for allocating icons, menu items, hot keys, etc. to camera function options; a routine for activating one or more cameras, included in the camera module 170, in a single view mode or multi-view mode, according to a camera function activating request; etc. The camera activating routine includes a routine for activating one of the cameras in the camera module 170 in a single view mode and a routine for activating a number of cameras in a multi-view mode. For example, when the electronic device 100 operates in a single view mode, the camera activating routine includes a routine for activating the front-facing camera when making a video call, and a routine for activating the rear-facing camera when taking images. When the electronic device 100 operates in a multi-view mode, the camera activating routine includes a routine for activating a number of cameras when making a video call or when taking images.

In embodiments of the present disclosure, the camera control program 151 includes a routine for analyzing subjects of preview images in a multi-view mode, and a routine for adjusting a layout based on the analyzed image and a preset function. The adjustment routine includes a routine for adjusting layouts of images where focuses of subjects are superimposed, a routine for adjusting the focusing size or position of subjects, and a routine for adjusting layouts by tracking subjects.

The camera module 170 includes a number of cameras, e.g., a first camera 171 and a second camera 172. The first camera 171 and second camera 172 may each be located on the front or back of the electronic device 100. The first camera 171 and second camera 172 may be identical to or different from each other in pixel count. For example, the first camera 171 is located on the front of the electronic device 100 and has a pixel count less than that of the second camera 172. The second camera 172 is located on the back of the electronic device 100 and has a pixel count greater than that of the first camera 171. When the first camera 171 and second camera 172 are activated, they obtain preview images and transfer them to the control module 160. The first camera 171 and second camera 172 takes images of particular subjects at a particular time point according to an image taking signal, and transfer the taken images to the control module 160. Although the embodiment of the present disclosure is described in such a way that the camera module 170 includes two cameras, it should be understood that the present disclosure is not limited to the embodiment. For example, the camera module 170 may also be implemented with three or more cameras. In that case, the electronic device 100 may provide two or more layouts to the respective cameras in a multi-view mode. The first camera 171 and second camera 172 perform a zoom function according to the layout adjustment by the control module 160. For example, the first camera 171 or second camera 172 zooms in/out a subject under the control of the control module 160. One or more of the cameras of the camera module 170 may be separated from the electronic device 100. In that case, the separated camera(s) are physically or logically connected to the electronic device 100 and controlled to take images or display taken images according to the control of the camera control program 151. For example, one or more cameras of the camera module 170 may be implemented in the form of accessories connectable to the electronic device 100.

The control module 160 performs transmission/reception of signals, date process, etc., to control the electronic device 100. For example, regarding modes, such as a single view mode, a multi-view mode, etc., the control module 160 processes the related signals, collects and processes the related data, etc. The control module 160 adjusts layouts related to a multi-view mode.

FIG. 2 is a detailed view of a control module 160 according to an embodiment of the present disclosure.

Referring to FIG. 2, the control module 160 includes an image obtaining module 161 and an image output module 163.

The image obtaining module 161 activates the first camera 171 and/or second camera 172 according to the settings or an input signal. The image obtaining module 161 controls the activated camera 171 and/or camera 172 to obtain or collect images of subjects. For example, the image obtaining module 161 obtains a preview image of the first camera 171 and a preview image of the second camera 172. The image obtaining module 161 performs an automatic focusing function for the obtained preview images. The image obtaining module 161 outputs the preview image information and the automatic focusing information to the image output module 163. The automatic focusing information includes the position of the focused subject, the focusing size of the subject, etc. The image obtaining module 161 transfers information about a background of the obtained image and information about objects or subjects to the image output module 163.

The image output module 163 determines whether to adjust the layout based on the preview image information and the automatic focusing information from the image obtaining module 161. When the image output module 163 ascertains that the layout needs to be adjusted, it performs corresponding operations. For example, the image output module 163 detects layout information about preview images that will be output to the display module 140. The layout information includes information about the size and position of the layout. The image output module 163 detects focusing information about preview images and also layout information to which corresponding focusing information is applied. During the detection, the image output module 163 determines whether focuses are superimposed by layouts to be output to the display module 140. When the image output module 163 ascertains that focusing positions are superimposed in the process of displaying layouts, it adjusts the size and position of the layouts. For example, the image output module 163 adjusts the position of the layouts so that the focusing positions are not superimposed. The image output module 163 adjusts the size of the layouts so that the focusing positions are not superimposed.

The image output module 163 may adjust the size and position of the layouts corresponding to the size of subjects or the focusing size. The image output module 163 detects the size of subjects or the focusing size of a subject on a preview image. For example, the image output module 163 detects the size of one or more subjects or the focusing size of the subject on preview images obtained by the first camera 171 and the second camera 172. If a number of subjects are included in a preview image, the image output module 163 detects the average of the size of the subjects or the average of the focusing size. The image output module 163 selects the largest and smallest subjects and obtains the average of the size of the selected subjects or the average of the focusing size. The image output module 163 detects the largest subject or the focusing size of the subject.

The image output module 163 may compare the size of a subject or focusing information about the subject on an image by the first camera 171 with the size of a subject or focusing information about the subject on an image by the second camera 172. The image output module 163 adjusts layouts related to a particular camera according to a pre-defined setting. For example, the image output module 163 adjusts a size or position of a layout related to the second camera 172, with respect to the layout related to the first camera 171. The image output module 163 also adjusts a position or size of a layout related to the first camera 171, with respect to the layout related to the second camera 172. In another embodiment, the image output module 163 performs a zoom function for a particular camera according to a pre-defined setting. For example, the image output module 163 performs a zoom-in/out function for the first camera 171. The image output module 163 adjusts a size and/or position of a subject that will be applied to a layout of images obtained by the first camera 171.

The image output module 163 adjusts the size and position of a layout depending on whether to detect a subject. For example, when an image, obtained by the first camera 171 or second camera 172, does not include the subject, the image output module 163 stops outputting a layout related to the corresponding camera. Meanwhile, when a subject appears on an image including a background that the first camera 171 or second camera 172 is taking, the image output module 163 resumes outputting a layout related to the image (preview image) by the corresponding camera. In another embodiment, while the image output module 163 tracks a subject on an image, when the subject is out of a range of taking images by a camera, it may reduce the corresponding layout in size or remove it from the display module 140.

Although it is not described in the description, the electronic device 100 may further include various modules to provide corresponding functions. For example, when the electronic device 100 is implemented to provide a communication function, it may include: a short-range communication module for short-range communication; an interface for transmitting/receiving data in a wireless or weird communication mode; an Internet communication module for providing Internet services; and a digital broadcast module for receiving and reproducing broadcasts. With the spread of digital convergence, although it is impossible to list all the modifications of electronic device in this description, it will be easily appreciated by those skilled in the art that the other components equivalent to the above-listed components may be further included in the electronic device 100 according to the invention. It will also be appreciated that, according to the purposes, the electronic device may be implemented by omitting a particular component or replacing it with other components.

In embodiments of the present disclosure, an electronic device includes: a camera module with a number of cameras; a display module for displaying one or more preview images, obtained by the cameras, on respective corresponding layouts; and a control module for adjusting the layouts, according to attributes of subjects included in the preview images displayed on the respective corresponding layouts, and the relationship between the subjects.

In embodiments of the present disclosure, the control module detects the size or position of focusing areas of subjects included in the layouts displaying the preview images and adjusts the layouts so that the focusing areas are not superimposed.

In embodiments of the present disclosure, the control module adjusts the position of the layouts so that the focusing areas are not superimposed.

In embodiments of the present disclosure, the control module adjusts the position of the subjects on a particular layout so that the focusing areas are not superimposed.

In embodiments of the present disclosure, the control module removes a layout without a subject from the display module.

In embodiments of the present disclosure, the control module controls the display module to display, when a particular subject enters a viewing angle of a particular camera, the layout corresponding to the preview on the display module, and to display the subject on the layout corresponding to the preview screen.

In embodiments of the present disclosure, the control module compares the subjects included in the layout displaying the preview image with each other in terms of size, and adjusts the size of the subjects so that the subjects are displayed on the display module within a pre-defined range of ratio in size.

In embodiments of the present disclosure, the control module compares the subjects included in the layout displaying the preview image with each other in terms of size, and adjusts the size of the layout displaying the subjects so that the subjects are displayed on the display module within a pre-defined range of ratio in size.

In embodiments of the present disclosure, the control module compares the subjects included in the layout displaying the preview image with each other in terms of size, and applies a zoom function to the obtained images or to the camera obtaining the images so that the subjects are displayed on the display module within a pre-defined range of ratio in size.

In embodiments of the present disclosure, the control module displays, when the same subject is duplicated and displayed on a number of layouts, part of the layouts displaying the same subject.

Figure 3:
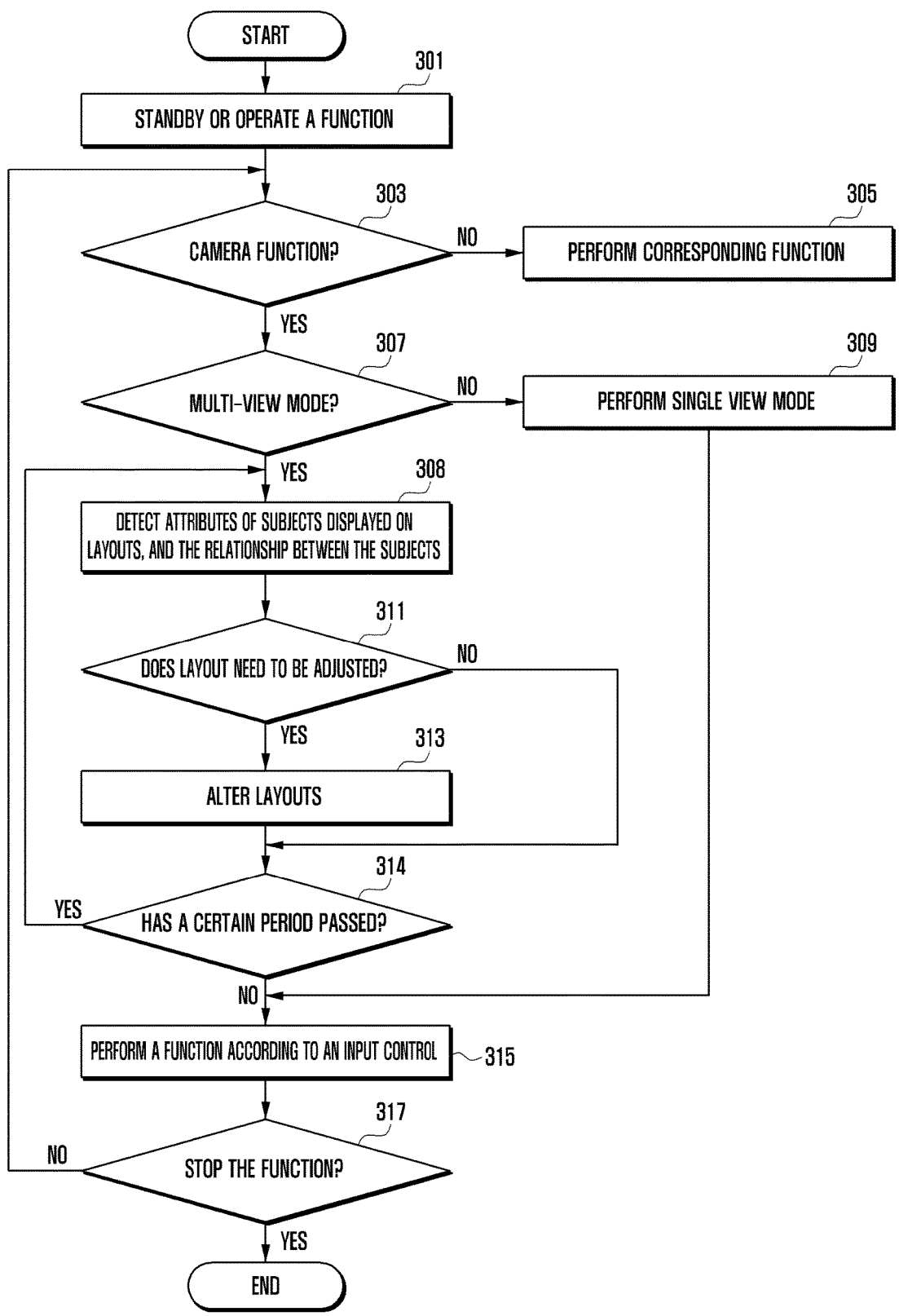
FIG. 3 is a flow chart that describes a method of displaying images, according to an embodiment of the present disclosure.

FIG. 3 is a flow chart that describes a method of displaying a camera's images, according to an embodiment of the present disclosure.

Referring to FIG. 3, the control module 160 operates in standby mode or controls a function (301). For example, the control module 160 turns off the display module 140, or controls the display module 140 to operate in a sleep mode or a standby mode. The control module 160 controls functions according to input events, such as a file playing function, a file searching function, a file creating function, a web accessing function, etc.

When the control module 160 detects that an event has occurred, it determines whether the event is an event for activating a camera function (303). When the control module 160 ascertains that the event is not an event for activating a camera function in operation 303, it performs a function corresponding to the event (305). For example, the control module 160 applies the event to the function that it has been performing. In an embodiment, the control module 160 controls a function of outputting screens according to a gallery application, and a gallery screen switching function according to the related events.

On the contrary, when the control module 160 ascertains that the event is an event for activating a camera function in operation 303, it loads the camera control program 151 from the storage module 150 and activates the camera module 170. The control module 160 determines whether a multi-view mode is set or an event for performing a multi-view mode has occurred (307). When the control module 160 ascertains that a multi-view mode is not set in operation 307, it performs a single view mode (309). In a single view mode, the control module 160 controls the supply of electric power to the first camera 171 or second camera 172 of the camera module 170. The control module 160 controls the display module 140 to output images obtained by the activated camera.

On the contrary, when the control module 160 ascertains that a multi-view mode is set or an event for performing a multi-view mode has occurred in operation 307, it activates a number (e.g., plurality) of cameras 171 and 172 included in the camera module 170. When the control module 160 receives images obtained by the cameras 171 and 172, it defines layouts to be output to the display module 140 according to each of the respective cameras 171 and 172. The control module 160 outputs images transmitted from the respective cameras to the defined layouts.

The control module 160 detects attributes of subjects included in images displayed on the number (e.g. plurality) of layouts and the relationship between the subjects (308). The control module 160 determines whether to adjust the layouts based on one or more of the attributes of subjects included in images displayed on the number of layouts, and the relationship between the subjects (311). For example, the control module 160 may determine whether layouts require adjustment, depending on whether focusing areas for each of the subjects are superimposed. In one embodiment, the control module 160 may determine whether layouts need to be adjusted, based on the size of the subjects in the images obtained by the respective cameras 171 and 172. In another embodiment, the control module 160 may determine whether layouts need to be adjusted, depending on whether a subject is detected as present within the images obtained by the respective cameras 171 and 172.

When the control module 160 ascertains that layouts need to be adjusted in operation 311, it alters the layouts (313). When layout adjustment is required due to the superimposition of focusing areas of the subjects, the control module 160 adjusts the position of the layouts so that the focusing areas are no longer superimposed. When a focusing area of a front layer is superimposed with that of the rear layer, the control module 160 arranges the subjects and layouts such that the subject of the layout arranged on the rear layer or the focusing area of the subject (e.g., the obstructed layer or focusing area) is no longer obstructed.

When layout adjustment is required due to the disparity in the relative size of subjects, the control module 160 adjusts the size of a subject included in one of the layouts so that the size of subjects included in the layouts or the focusing areas are similar to each other. The control module 160 may also adjust the position of the layouts where the subjects have been adjusted in size. The control module 160 adjusts the size of displayed layouts, based on images obtained by a particular camera. The control module 160 controls a particular camera to obtain images by using a zoom function and updates the images on the layouts with the zoomed images. The control module 160 may adjust the layouts based on the size of subjects by using one or more of the functions, such as a subject size altering function, a layout size altering function, a layout position altering function, and zooming in/out a subject.

When layout adjustment is performed depending on whether a subject is detected within a layout, the control module 160 may remove layouts lacking a subject from the display module 140. In response to the removal of a particular layout, the control module 160 alters the size and/or position of another layout including a subject. For example, in an environment where two layouts are displayed on the display module 140, when one layout is removed from the display module 140, the control module 160 controls the display module 140 to display the other layout on the whole screen. When a subject enters a view of a camera, where any subject previously did not exist, the control module 160 may generate a new layout to display images of the subject. During the operation, the control module 160 may reduce the size of an already-displayed layout, so that additional layouts can be displayed on the display module 140.

After altering the layouts in operation 313, the control module 160 determines whether a certain period has elapsed (314). When the control module 160 ascertains that a certain period has elapsed in operation 314, it returns to operation 308 and adjusts layouts in multi-view mode from operations 308 to 314.

On the contrary, when the control module 160 ascertains that a certain period has not elapsed in operation 314, it supports a function according to an input control (315). For example, when the control module 160 detects a signal related to an input for taking images, it takes images from the preview screen displayed on the display module 140. The control module 160 receives a signal related to an input for storing images, it stores the taken images. Meanwhile, when the control module 160 ascertains that layouts do not need to be adjusted in operation 311, it proceeds with operation 314.

After performing a function in operation 315, the control module 160 determines whether an event for terminating the function has occurred (317). When the control module 160 ascertains that an event for terminating the function has not occurred in operation 317, it returns to operation 303. On the contrary, when the control module 160 ascertains that an event for terminating the function has occurred in operation 317, it terminates the function of the electronic device 100.

Figure 4:
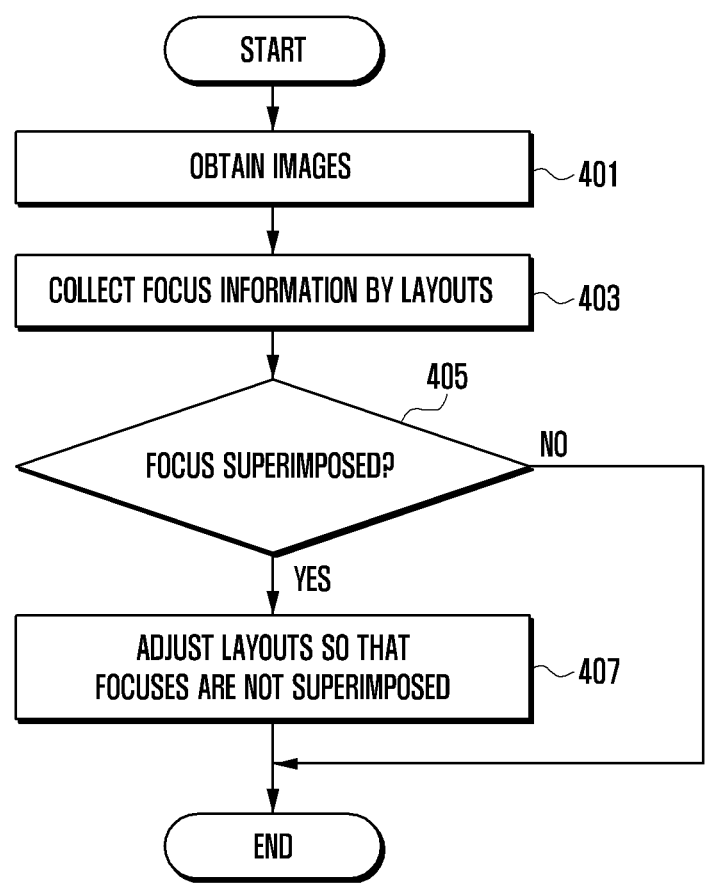
FIG. 4 is a flow chart that describes a method of displaying images related to focus superimposition, according to an embodiment of the present disclosure.

FIG. 4 is a flow chart that describes a method of displaying a camera's images related to focus superimposition, according to an embodiment of the present disclosure. In the following description, the layout adjustment for obtained images will be explained in detail. The embodiment is described in such a way that the control module 160 controls an image acquisition process and the operations of the camera module 170. However, it should be understood that the invention is not limited to the embodiment. For example, a signal processor related to the operations of the camera module 170 may be designed so that it is included in the camera module 170. In that case, the camera module 170 calculates the focusing information and transfers it to the control module 160.

Referring to FIG. 4, the control module 160 controls an image acquisition operation (401). In the control of image acquisition, the control module 160 determines whether a multi-view mode is set. When the control module 160 ascertains that a multi-view mode is set, it activates a number of cameras 171 and 172 included in the camera module 170. The control module 160 detects whether a process mode or a function setting for a focus superimposition environment is set by detecting a set mode or a selected function. When a function setting for a focus superimposition process is set in a multi-view mode, the control module 160 receives preview images from the activated cameras 171 and 172 according to a pre-defined setting.

When the control module 160 receives preview images, it collects information about focuses by layouts (403). The control module 160 controls focusing operations for images obtained by respective cameras. For example, the control module 160 detects the position of subjects on the preview images of the cameras 171 and 172, and performs automatic focusing operations for the respective subjects. The control module 160 collects information about the focusing position and information about the focusing size while performing the focusing operation.

The control module 160 determines whether focuses are superimposed (405). The control module 160 detects the positions on the display module 140 to which images obtained by the respective cameras will be output. In this operation, the control module 160 compares the position and size of the focusing area on the image output to the display module 140, collected by one camera, with those by another camera, and determines whether the focus positions are superimposed in an environment output to the display module 140.

When the control module 160 ascertains that focuses are superimposed in operation 405, it adjusts layouts so that the focuses are not superimposed (407). The control module 160 detects the position of images obtained by the respective cameras and output to the display module 140. The control module 160 calculates the position on the display module 140 to which the images obtained by the respective cameras will be output without superimposition. In this operation, the control module 160 calculates the position of images obtained by the respective cameras on the display module 140 so that the focusing areas of the images are displayed without superimposition. After calculating the position of images, the control module 160 adjusts the display position of the images obtained by the respective cameras to the calculated position. The control module 160 may output a pop-up window corresponding to a confirmation input for the position adjustment. When a confirmation input occurs, the control module 160 adjusts the output position of images by the respective cameras. When a cancellation input occurs, the control module 160 makes a control to retain the output of the images where focusing areas are superimposed.

When the control module 160 ascertains that focuses are not superimposed in operation 405, it terminates the function without performing operation 407.

As described above, according to embodiments of the present disclosure, in an environment where subjects of images obtained by respective cameras are output to the display module 140, the control module 160 of the electronic device 100 according to the present disclosure may adjust the output position of the images by the respective cameras so that the subjects of the images by the respective cameras or the focusing areas are not superimposed. When a layout is provided to the display module 140 in a range smaller than that of an image obtained by a camera, the embodiments of the present disclosure may configure screens of the display module 140 so that the optimized areas can be confirmed by adjusting the position of images obtained by the respective cameras.

Figure 5:
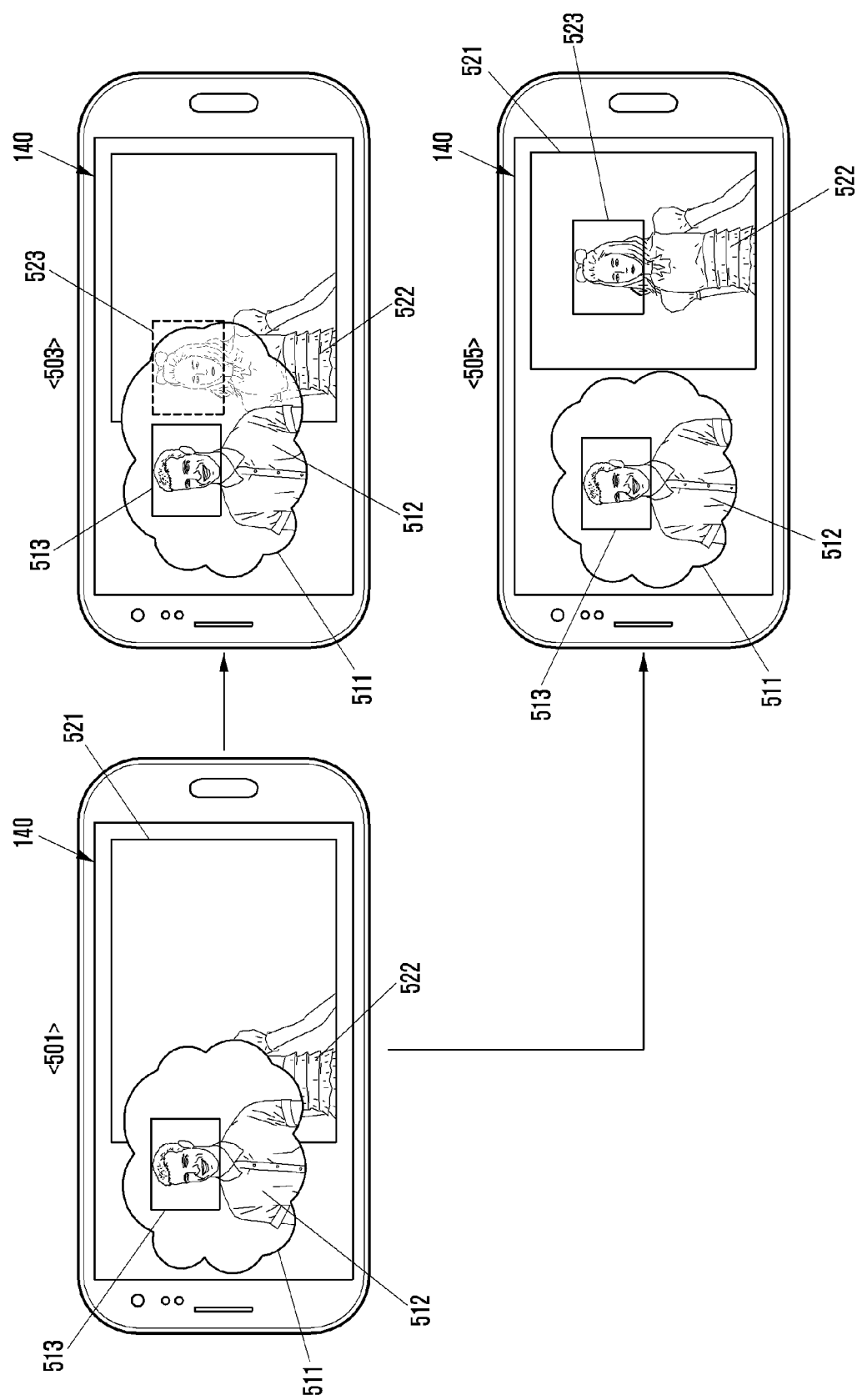
FIG. 5 illustrates a screen interface related to a focus superimposition process according to an embodiment of the present disclosure.

FIG. 5 illustrates example views of a screen interface for a focus superimposition process according to an embodiment of the present disclosure.

According to embodiments of the present disclosure, referring to FIG. 5, the display module 140 may output images obtained by a number of activated cameras 171 and 172 on the screen as shown in diagram 501. The display module 140 may output images obtained by the cameras 171 and 172 at pre-defined positions on layouts 511 and 521. For example, an object 512 captured by the first camera 171 may be output on the layout 511 with a background object. An object 522 captured by the second camera 172 may be output on the layout 521 with a background object. The control module 160 may perform a focusing operation for the objects 512 and 522. The control module 160 may display a focusing area 513 for the object 512 on the layout 511.

According to embodiments of the present disclosure, since the object 512 is superimposed on the object 522 output on the layout 521, part of the subject corresponding to the object 522 is obstructed from display. When a request is made to process focusing superimposition, the control module 160 may calculate focusing information for the object 522, and detect whether the object 522 is superimposed with the focusing area 513 of the object 512 on the display module 140.

When the control module 160 ascertains that the object 522 is superimposed with the object 512, it may display the focusing area 523 of the object 522 on the screen as shown in diagram 503. In this operation, the control module 160 applies a dashed line or a translucency to part of the object 522 hidden or obstructed by the object 512, thereby displaying the portion of the object being in a superimposed state. The control module 160 may output a pop-up window to confirm whether to perform a layout adjustment in a state where superimposition is present on the screen, as shown in diagram 503. When a layout adjustment request is made, the control module 160 may perform a position adjustment of the layouts 511 and 521 as shown in diagram 505. For example, the control module 160 may adjust the position of the layout 521 so that the objects 512 and 522 are displayed without any superimposition. As shown in diagram 505, the display module 140 may thus display the object 512, and a screen area including the focusing area 513 on the layout 511. The display module 140 may also display the object 522 and a screen area including the focusing area 523 on the layout 521. As seen in diagram 505, the layout 521 is no longer superimposed with the layout 511 after the adjustment.

According to embodiments of the present disclosure, in a state as shown in diagram 501, the control module 160 may detect superimposition between the object 512 and 522 by comparing the focusing areas and automatically adjust the layouts. For example, when a focusing superimposition has occurred on the screen as shown in diagram 501, the control module 160 may automatically adjust the layouts so that they are arranged without superimposition as shown in diagram 505.

In another embodiment, the control module 160 may adjust the position of the object 522 on the layout 521, instead of adjusting the position of the layout 521, so that a focusing superimposition does not occur. In that case, the object 522 changes in position on the layout 521 while the layout 521 is fixed.

Figure 6:
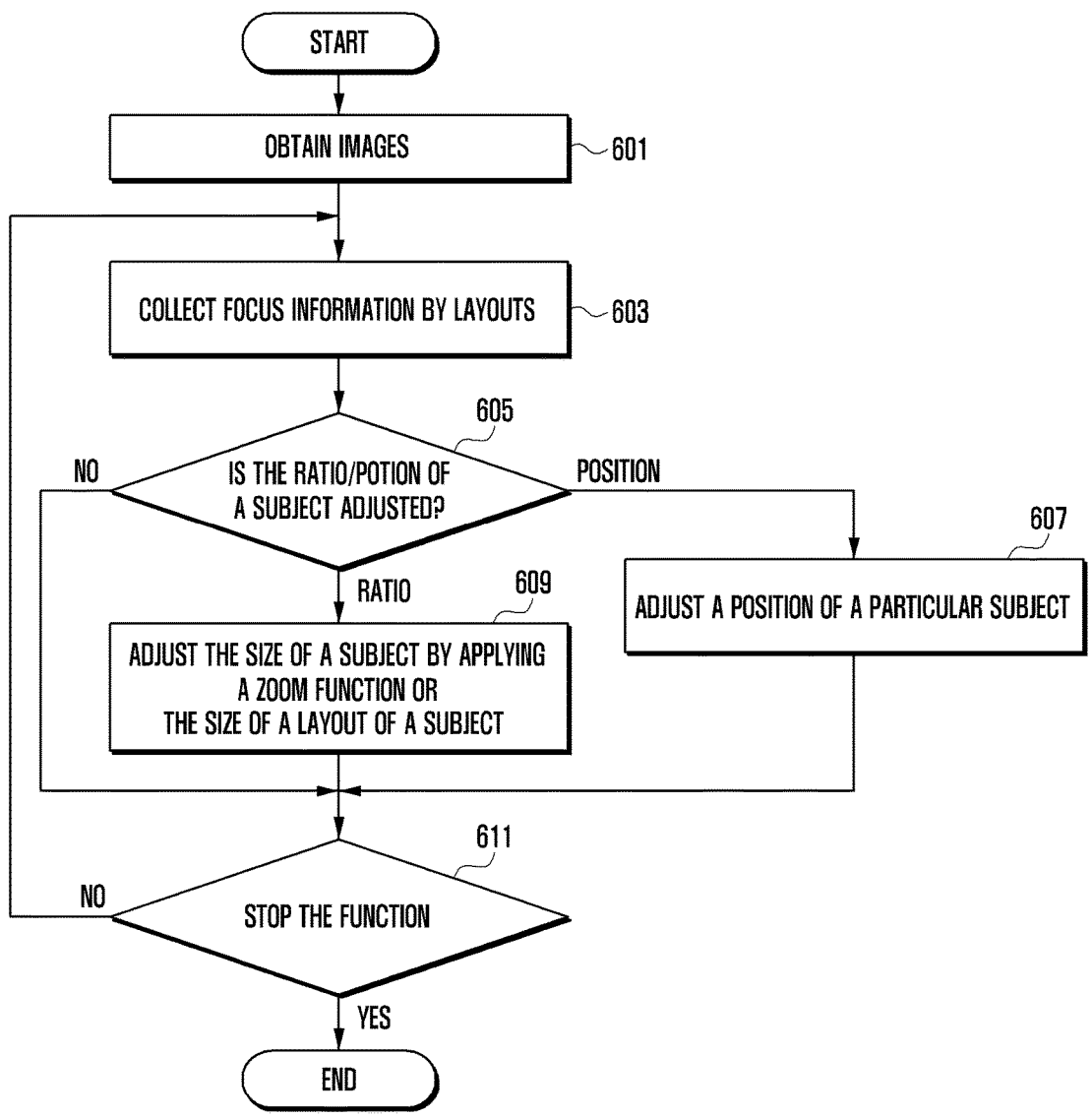
FIG. 6 is a flow chart that describes a method of displaying and modifying images utilizing the size and position of a subject, according to an embodiment of the present disclosure.

FIG. 6 is a flow chart that describes a method of displaying a camera's images related to the size and position of a subject, according to an embodiment of the present disclosure.

Referring to FIG. 6 the control module 160 controls an image acquisition operation (601). The control module 160 collects information about focuses by layouts (603). Operations 601 and 603 are performed in a similar way to operations 401 and 403 of the embodiment referring to FIG. 4. For example, the control module 160 activates a number of cameras 171 and 172 included in the camera module 170, receives preview images from the cameras, display the received preview images on respective corresponding layouts, and collects information about focuses by layouts.

The control module 160 determines whether a request is made to adjust the ratio/position of a subject (605). The control module 160 determines whether a function related to the ratio/position adjustment of subject is set in a multi-view mode. The control module 160 determines whether an input event related to the ratio/position adjustment of subject has occurred.

When the control module 160 ascertains that a request is made to adjust the position of subject in operation 605, it adjusts the position of a subject (607). The control module 160 determines whether subjects are displayed in proper form on the layouts defined in the display module 140. In this operation, the control module 160 detects information about a subject or objects in the obtained image and information about a subject output to the layout. When the control module 160 ascertains that the information about a subject in the obtained image is not output in a complete form, it adjusts the position of the subject on the layout. For example, the control module 160 adjusts the position of an area of the obtained image, which is output to the layout.

When the control module 160 ascertains that a request is made to adjust the ratio of subject in operation 605, it adjusts the size of a subject by applying a zoom function or the size of a layout of a subject (609). For example, the control module 160 collects information about the size of the subjects output on a number of layouts or information about the focusing size of the subjects. The control module 160 compares the collected focusing sizes with each other by layouts. When there is a difference between the focusing sizes by layouts, the control module 160 alters the size of a particular layout or the size of a subject by applying a zoom function. The control module 160 may adjust the ratio/position of a subject, based on a pre-defined subject size. For example, from among the size of subjects displayed on a particular layout, based on the size of subject satisfying a pre-defined size, the control module 160 may control a subject size alteration of another layout or a layout size alteration. The control module 160 may calculate the size average of the subjects displayed on the layouts, and control a subject size alteration of the layouts or a layout alteration, based on the calculated average.

The control module 160 determines whether a termination related event occurs (611). When the control module 160 ascertains that a termination related event has not occurred in operation 611, it returns to operation 603. On the contrary, when the control module 160 ascertains that a termination related event has occurred in operation 611, it controls a function termination of the electronic device 100.

FIG. 7 illustrates example screen views for displaying multiple images when executing position alteration of subject, according to an embodiment of the present disclosure.

Referring to FIG. 7, the control module 160 operates a multi-view mode function, activates a number of cameras 171 and 172 included in the camera module 170, and configures a number of screens to display preview images obtained from the cameras 171 and 172. In this operation, the control module 160 defines layouts for each of the respective cameras, and outputs part of the captured images from each camera to the respective layout. The display module 140 may support displaying multiple images, and outputs a screen including a focusing area 713 and an object 712 for the layout 711, as shown in diagram 701. The display module 140 may also outputs a screen area including a focusing area 723 and an object 722 for the layout 721, as shown in diagram 701.

When the control module 160 outputs the object 712 on the layout 711, it determines whether the object 712 is completely arranged (e.g., disposed or positioned) within the area of the layout 711. To this end, the control module 160 detects the boundary of the object 712 via a filtering operation, and determines whether the boundary of the object 712 extends over the boundary of the layout 711. The control module 160 determines whether the focusing area 713 exceeds a range of the boundary of the layout 711. When the control module 160 ascertains that the boundary of the object 712 or the boundary of the focusing area 713 exceeds the boundary of the layout 711, as shown in diagram 701, it may adjust the layout 711 as shown in diagram 703. For example, the control module 160 may adjust the position of the object 712 on the layout 711 so that the focusing area 713 is arranged in a proper location within the layout 711, such as the center of (or centered within) the layout 711.

When the control module 160 ascertains that the object 722 is arranged (e.g., disposed or positioned) in a proper location within the layout 721, it performs a control operation so that the layout 721 retains the current state. For example, when the control module 160 ascertains that the focusing area 723 is arranged within a preset location of the layout 721, it may conclude that a layout adjustment request has not been made.

Figure 8:
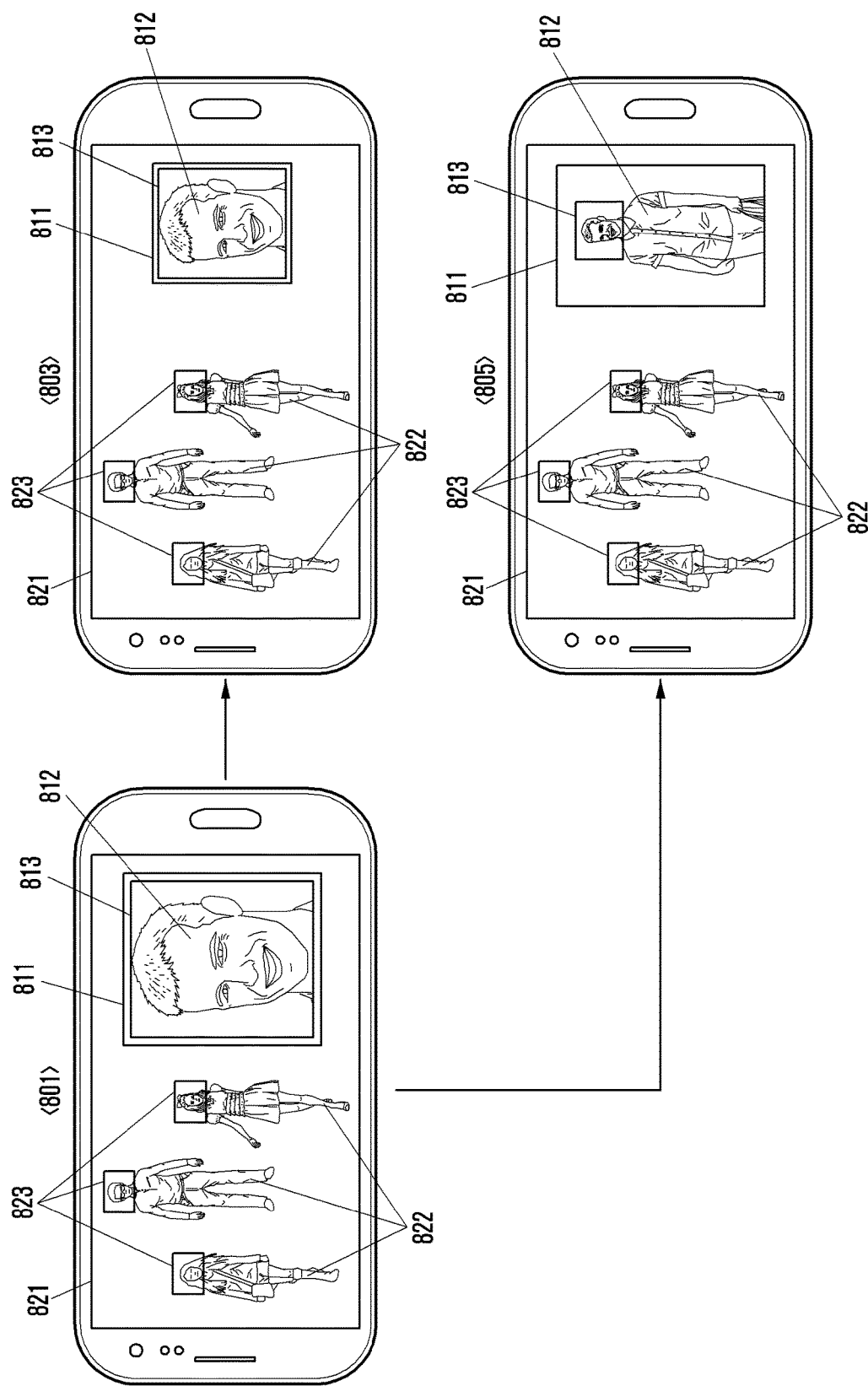
FIG. 8 illustrates example screens displaying multiple images for altering a ratio of a subject, according to an embodiment of the present disclosure.

FIG. 8 illustrates example screens displaying multiple images related ratio alteration of a subject, according to an embodiment of the present disclosure.

Referring to FIG. 8, the control module 160 activates a number of cameras 171 and 172 in a multi-view mode. The control module 160 receives preview images captured by the cameras 171 and 172 and configures the screens, controlling the display module 140 to output multi-view screens. As shown in diagram 801, the display module 140 outputs the object 812 on the layout 811 based on the preview image received from the first camera 171. The display module 140 further outputs (e.g., displays) a focusing area 813 for the object 812 on the layout 811. The control module 160 applies a focusing operation to a particular subject of the object 812 and controls the display module 140 to output a focusing area 813 according to the focusing operation.

The control module 160 controls the display module 140 to output objects 822 corresponding to subjects on the layout 821, along with a background object, based on the preview image acquired from the second camera 172. The control module 160 applies a focusing operation to the objects 822. When the control module 160 performs a multiple focusing function, it controls the display module 140 to output focusing areas 823 as shown in diagram 801. The control module 160 compares the object 812 with the objects 822 to detect their size relative to one another. In this operation, the control module 160 compares the size of the object 812 with the size of one of the objects 822. The control module 160 also compares the size of the object 812 with the average size of the objects 822. The control module 160 may compare the size of the object 812 with at least one of the size of one or more of the objects 822. The control module 160 may also compare the size of object 812 with the size of a largest, a smallest, or a medium sized object among the objects 822. The control module 160 calculates the arithmetic mean between the sizes of the object 812 and objects 822. When the layout 811 includes a plurality of objects, the control module 160 applies one of the methods applied to the objects 822 (as described above) to the plurality of objects disposed in the layout 811.

When the control module 160 calculates the object size according to a pre-defined method, it adjusts the size of the object 812 according to the calculated object size as shown in diagram 803. For example, as the control module 160 reduces the size of the layout 811 as shown in diagram 803, it may alter the size of the object 812 on the layout 811. In another embodiment, the control module 160 applies a zoom function to images obtained by the first camera 171 or controls the first camera 171 to obtain zoomed images. The display module 140 outputs the object 812 to which a zoom-out function is applied on the screen as shown in diagram 805. The focusing area 813 is thus altered in size and position according to the alteration of the object 812.

Although the embodiment is described in such a way that the layout 811 is altered by altering the size of the object 812 displayed on the layout 811 or by applying a zoom function, it should be understood that the present disclosure is not limited to the disclosed embodiment. For example, the control module 160 may alter the size of the objects 822 or apply a zoom function to images obtained by the second camera 172, thereby altering the objects 822 or the layout 821 in size.

Figure 9:
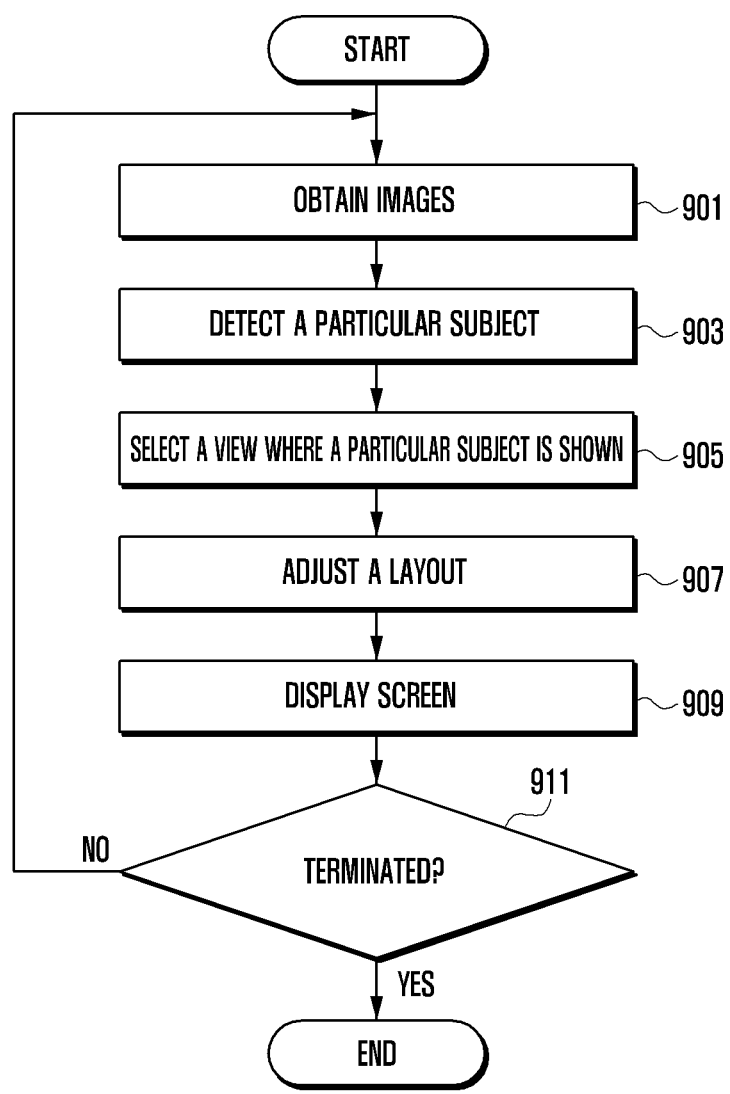
FIG. 9 is a flow chart that describes a method of displaying images depending on whether a subject is detected, according to an embodiment of the present disclosure.

FIG. 9 is a flow chart that describes a method of displaying a camera's images depending on whether to detect a subject, according to an embodiment of the present disclosure.

Referring to FIG. 9, the control module 160 controls an image acquisition (901). In this operation, the control module 160 activates a number of cameras 171 and 172 and receives preview images from the activated cameras.

The control module 160 detects a particular subject or object (903). The control module 160 determines whether a subject corresponding to the human face is included in the preview image. In order to recognize the human face, the control module 160 applies a facial recognition algorithm to objects.

The control module 160 selects a view where a particular subject is included (905). The control module 160 performs layout adjustment (907). When the control module 160 ascertains that particular subjects are included in respective views provided by the cameras 171 and 172, it defines a number of layouts on the display module 140. The control module 160 allocates the preview images provided by the cameras to the defined layouts, respectively.

The control module 160 performs screen display (909). The control module 160 controls the display module 140 to arrange a number of layouts in pre-defined areas and to output preview images including particular subjects on the respective layouts. Meanwhile, the control module 160 may exclude a view without a particular subject in operation 905. For example, when a preview image from the second camera 172 does not include a particular subject, the control module 160 may not perform the layout allocation for the preview image. That is, the control module 160 may perform layout allocation for the preview images provided by the first camera 171. In this operation, in order to display the layouts related to the first camera 171 on the display module 140, the control module 160 adjusts the size of the layout. For example, the control module 160 may define the corresponding layout to display on the whole screen of the display module 140.

In another embodiment, when the control module 160 receives preview images from three cameras, it defines three layouts corresponding to the three cameras, respectively. In this operation, when the control module 160 ascertains that a preview image from a second camera does not include a subject, it re-defines two layouts for first and third cameras, respectively and configures screens to be output on the display module 140. In that case, the control module 160 defines two layouts to be displayed on the display module 140 in a certain size.

The control module 160 determines whether a termination related event occurs (911). When the control module 160 ascertains that a termination related event has not occurred in operation 911, it returns to operation 901. On the contrary, when the control module 160 ascertains that a termination related event has occurred in operation 911, it controls a function termination of the electronic device 100.

Figure 10:
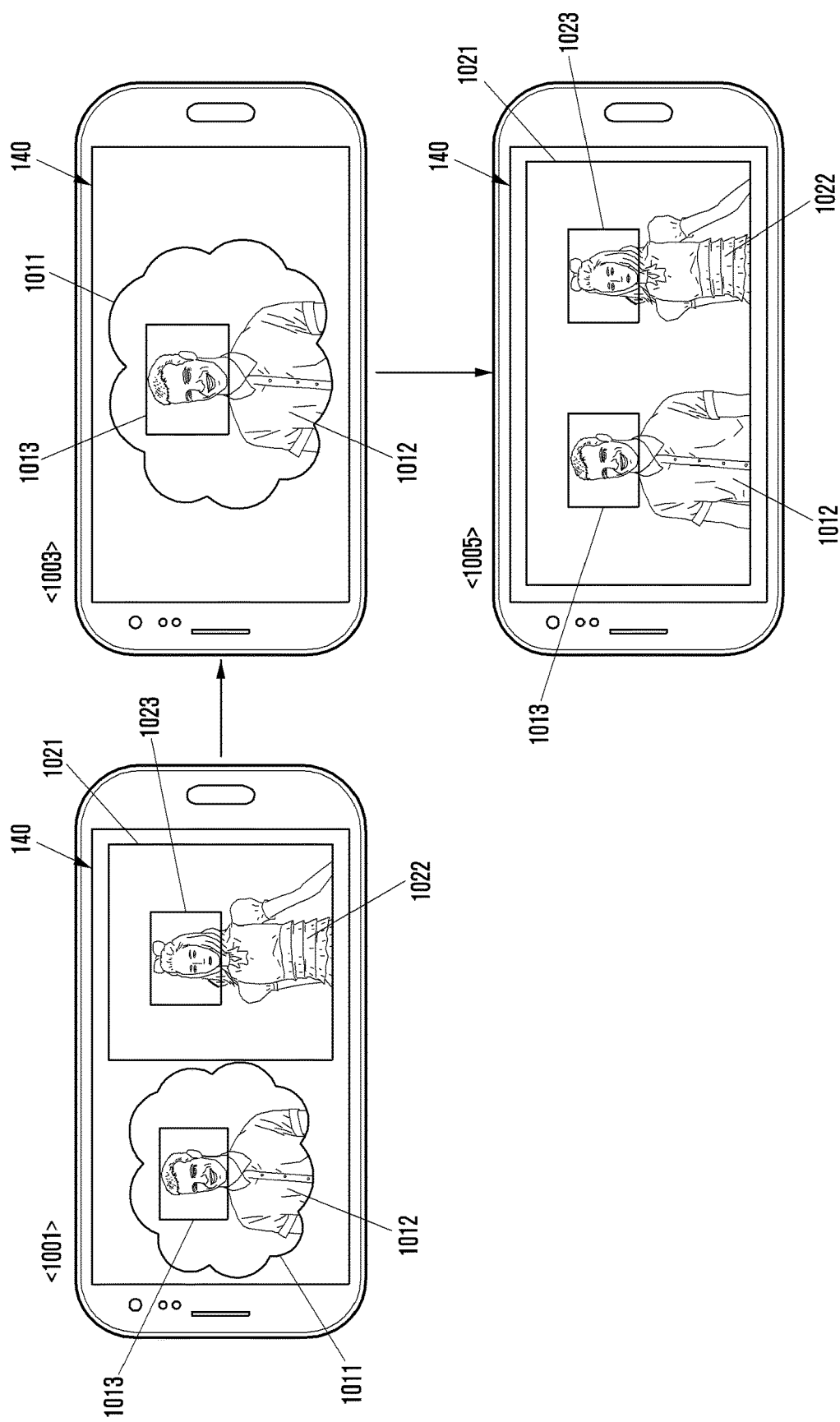
FIG. 10 illustrates example screens of a method of displaying multiple images according to whether a subject is detected, according to an embodiment of the present disclosure.

FIG. 10 illustrates example screens describing a method of displaying multiple images depending on whether a subject is detected within a viewing angle of one of the cameras, according to an embodiment of the present disclosure.

Referring to FIG. 10, the control module 160 activates a number of cameras 171 and 172 in a multi-view mode. The control module 160 receives preview images captured by the cameras 171 and 172 and configures the screen, outputting the multi-view screens on the display module 140 as shown in diagram 1001. The display module 140 outputs an area where an object 1012 with a focusing area 1013 are output on the layout 1011, and an area where an object 1022 with a focusing area 1023 are output on the layout 1021, as shown in diagram 1001.

In some embodiments of the present disclosure, the objects may be moved (e.g. repositioned). The viewing angles of the cameras 171 and 172 may be altered. For example, an object, (e.g., object 1022), may be out of the viewing angle of the second camera 172, depending on the change in viewing angle. When the control module 160 ascertains that an object 1022 or a subject corresponding to a human face is not included in a preview image from the second camera 172, it may remove the layout 1021 corresponding to the second camera 172 from the screen as shown in diagram 1003. When removing the layout 1021, the control module 160 may alter the layout 1011 in size. For example, the control module 160 controls the display module 140 to output the layout 1011 on the whole screen as shown in diagram 1003. The control module 160 may alter the size of the object 1012 and the size of the focusing area 1013, so as they correspond in size to the alteration of the size of the layout 1011. Alternatively, the control module 160 alters the size of the layout 1011 and performs a control operation so that the size of the object 1012 and the size of the focusing area 1013 are kept as shown in diagram 1001.

As objects continue moving, the object 1012 may disappear from the viewing angle of the first camera 171. The objects 1012 and 1022 may appear in the viewing angle of the second camera 172. When the control module 160 ascertains that the objects 1012 and 1022 have entered the viewing angle of the second camera 172, it outputs the object 1012 with the focusing area 1013, and the object 1022 with the focusing area 1023 on the layout 1021, as shown in diagram 1005. The control module 160 may remove the layout 1011 from the display module 140 and displays the layout 1021 as the whole screen of the display module 140.

Figure 11:
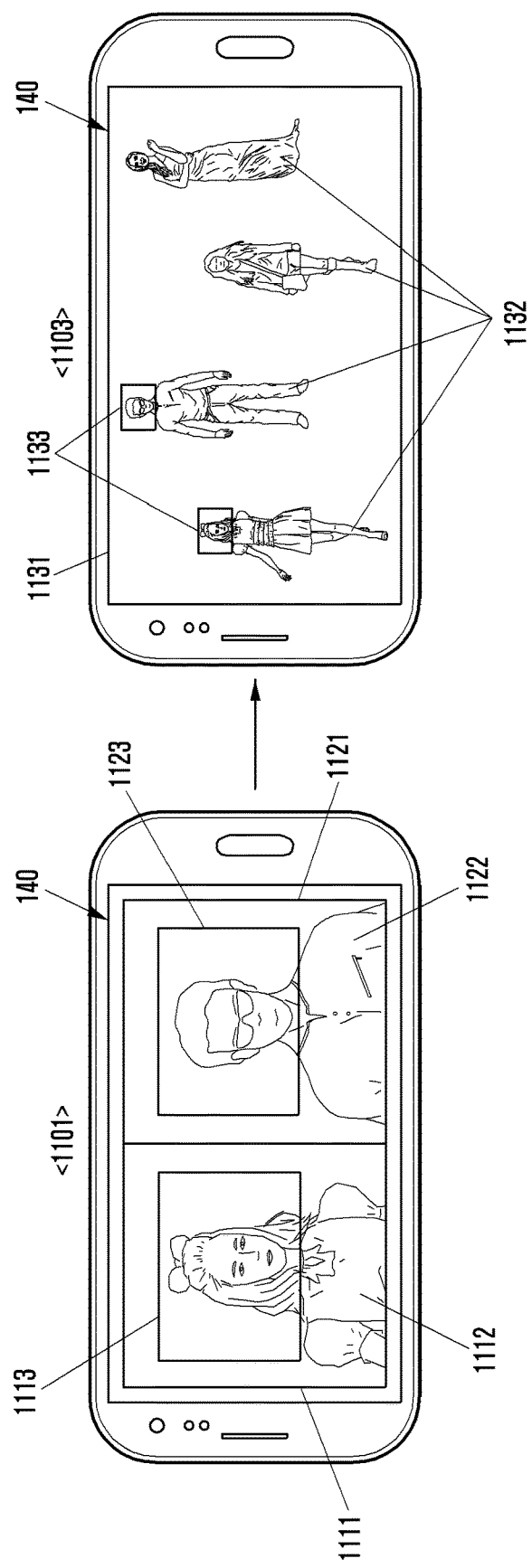
FIG. 11 illustrates example screens of a method for displaying multiple images according to duplication of a subject, according to an embodiment of the present disclosure.

FIG. 11 illustrates example screens describing a method of displaying multiple images related to duplication of a subject, according to an embodiment of the present disclosure.

Referring to FIG. 11, the control module 160 activates a number of cameras 171 and 172 in a multi-view mode. The control module 160 receives preview images from the cameras 171 and 172 and configures the screens, outputting an object 1112 and a focusing area 1113 on the layout 1111, as shown in diagram 1101. The control module 160 outputs an object 1122 and a focusing area 1123 on the layout 1121, as shown in diagram 1101.

With the movement of objects, when a particular subject exits the viewing angle of the camera 171 and/or 172 that have been taking images and particular subjects exist within the viewing angle of the other camera, e.g., a third camera, the control module 160 performs a control operation so that objects/subjects 1132 and a plural focusing area 1133 are output on the layout 1131 as shown in diagram 1103. When the control module 160 is set to provide only two focusing areas, it may provide the focusing areas 1133 for two objects as shown in FIG. 11. That is, as shown in diagram 1103, the left subject of the two subjects of the focusing area 1133 corresponds to the object 1112, and the right subject of the two subjects of the focusing area 1133 corresponds to the object 1122. It is noted that the opposite case is also possible. The control module 160 may also perform a control operation so as to output the layout 1131 including the objects 1112 and 1122.

Figure 12:
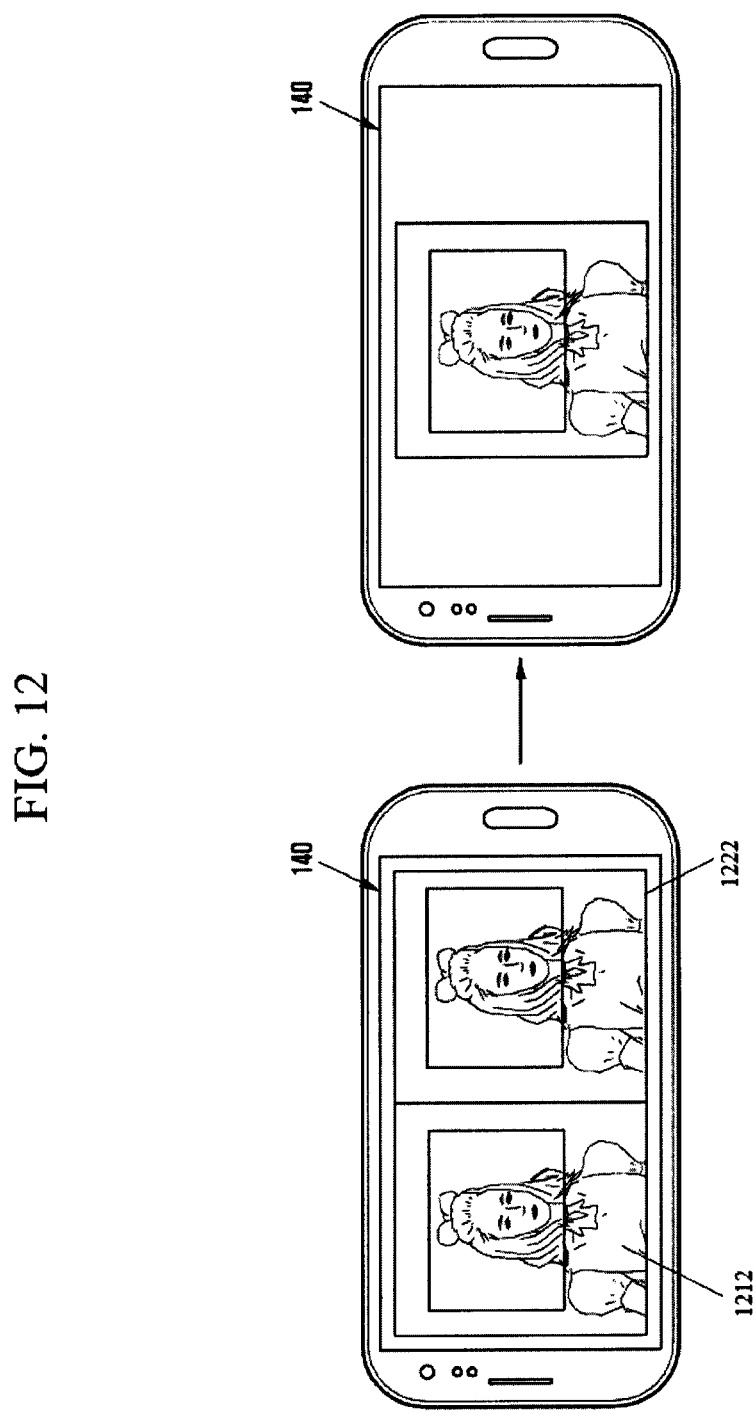
FIG. 12 illustrates example screens of a method for displaying duplicate layouts, according to an embodiment of the present disclosure.

In another embodiment, according to the application of a zoom function, the subjects within the viewing angle of the first camera 171 may be identical to those within the viewing angle of the second camera 172. FIG. 12 illustrates example screens of a method for displaying duplicate layouts, according to an embodiment of the present disclosure. As shown in FIG. 12, when the first camera 171 and second camera 172 are arranged on the rear side of the electronic device 100 and operate in a zoomed-in state, they may provide a preview image of one subject, respectively. When operating in a zoomed-out state, the first camera 171 and second camera 172 may obtain preview images including the same subjects. For example, the preview images including the objects 1212 and 1222 may be captured by the cameras 171 and 172, respectively. In that case, the control module 160 removes a layout corresponding to one of the first camera 171 and the second camera 172 and maintains a layout corresponding to the other (or remaining) camera. As described above, when the control module 160 receives preview images from the cameras 171 and 172 in which a subject is duplicated, it may perform a layout adjustment.

As described above, the image display method and the electronic device according to the present disclosure adaptively adjust a layout of multiple images obtained by a number of cameras, thereby easily displaying, obtaining and editing images in a dual view mode.

In addition, the image display method and electronic device according to the present disclosure process images in a simplified manner, consuming relatively low power.

In embodiments of the present disclosure, method of displaying images includes: receiving preview images from a number of camera modules; and displaying one or more of the preview images on respective corresponding layouts. Displaying one or more of the preview includes: adjusting the layouts according to attributes of subjects, included in the preview images displayed on the respective corresponding layouts, and the relationship between the subjects.

In embodiments of the present disclosure, displaying one or more of the preview includes: detecting the size or position of focusing areas of the subjects included in the layouts displaying the preview images; and adjusting, when the focusing areas are superimposed, the layouts so that the focusing areas are not superimposed.

In embodiments of the present disclosure, displaying one or more of the preview includes: adjusting the position of the layouts so that the focusing areas are not superimposed.

In embodiments of the present disclosure, displaying one or more of the preview includes: adjusting the position of the subjects on a particular layout so that the focusing areas are not superimposed.

In embodiments of the present disclosure, the method further includes: removing a layout without a subject from a display module.

In embodiments of the present disclosure, the method further includes: controlling a display module to display, when a particular subject enters a viewing angle of a particular camera, the layout corresponding to the preview, and to display the subject on the layout corresponding to the preview screen.

In embodiments of the present disclosure, displaying one or more of the preview includes: comparing the subjects included in the layout displaying the preview image with each other in terms of size; and adjusting the size of the subjects so that the subjects are displayed on a display module within a pre-defined range of ratio in size.

In embodiments of the present disclosure, displaying one or more of the preview includes: comparing the subjects included in the layout displaying the preview image with each other in terms of size; and adjusting the size of the layout displaying the subjects so that the subjects are displayed on a display module within a pre-defined range of ratio in size.

In embodiments of the present disclosure, displaying one or more of the preview includes: comparing the subjects included in the layout displaying the preview image with each other in terms of size; and applying a zoom function to the obtained images or to a camera obtaining the images so that the subjects are displayed on a display module within a pre-defined range of ratio in size.

In embodiments of the present disclosure, displaying one or more of the preview includes: displaying, when the same subject is duplicated and displayed on a number of layouts, part of the layouts displaying the same subject.

Part of the method (e.g., operations) or system (e.g., modules or functions) according to the embodiments of the present disclosure can be implemented with instructions as programming modules that are stored in computer-readable storage media. One or more processors can execute instructions, thereby performing the functions. An example of the computer-readable storage media may be memory. Part of the programming modules can be implemented (executed) by processor. Part of the programming module may include modules, programs, routines, sets of instructions or processes, etc., in order to perform one or more functions.

Examples of computer-readable media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" constitutes hardware in the claimed invention. Under the broadest reasonable interpretation, the appended claims constitute statutory subject matter in compliance with 35 U.S.C. § 101.

Although example embodiments of the invention have been described in detail above, it should be understood that many variations and modifications of the basic inventive concept herein described, which may be apparent to those skilled in the art, will still fall within the ambit of the example embodiments of the invention as defined in the appended claims.

What is claimed is:

1. An electronic device comprising:
a plurality of cameras including a first camera configured to capture a first preview image of a first subject and a second camera configured to capture a second preview image of a second subject;
a display configured to display at least one of the first preview image or the second preview image; and
a processor configured to control operations of:
activating the plurality of cameras;
capturing the first preview image of the first subject with the first camera and the second preview image of the second subject with the second camera;
displaying, on the display, the first preview image in a first layout and the second preview image in a second layout, wherein the first subject corresponds to a first focusing area and the second subject corresponds to a second focusing area; and
adjusting at least one of the displayed first layout and the displayed second layout according to attributes of the first subject, the first focusing area, the second subject, and the second focusing area,
wherein the adjusting comprises:
tracking at least one the first subject on the first preview image and the second subject on the second preview image;
determining if the first subject is out of a viewing range of the first camera or if the second subject is out of a viewing range of the second camera;
if the first subject is out of a viewing range of the first camera, terminating a display of the displayed first preview image and the first layout;
if the second subject is out of a viewing range of the second camera, terminating a display of the displayed second preview image and the second layout;
detecting whether a single subject is duplicated as the first subject and the second subject on the display; and
when the single subject is duplicated, terminating display of one of the first layout and the second layout so that the single subject is no longer duplicated on the display.

2. The electronic device of claim 1, wherein adjusting at east one of the displayed first layout and the displayed second layout further comprises:
detecting at least one of a size or a position of the first focusing area and second focusing areas of the first and second layouts, and
altering at least one of the size or the position of the at least one of the displayed first and second layouts so that the first focusing area and the second focusing areas do not overlap.

3. The electronic device of claim 2, wherein the processor alters a position of at least one of the first subject within the first layout and the second subject within the second layout so that the first focusing area does not overlap with the second focusing area.

4. The electronic device of claim 1, wherein the first subject and the second subject comprise a face shape of a human.

5. The electronic device of claim 1, wherein adjusting at least one of the displayed first layout and the displayed second layout further comprises:
in response to detecting a particular subject entering into a viewing angle of an activated camera of the plurality of cameras, displaying a new layout corresponding to a preview image captured by the activated camera including the particular subject.

6. The electronic device of claim 1, wherein adjusting at least one of the displayed first layout and the displayed second layout further comprises:
comparing a first size of the first subject with a second size of the second subject, and
adjusting at least one of the first size and the second size so that the first subject and second subject are displayed on the display within a pre-defined size ratio range.

7. The electronic device of claim 1, wherein adjusting at least one of the displayed first layout and the displayed second layout further comprises:
comparing a first size of the first subject with a second size of the second subject, and
adjusting a size of at least one of the first layout and the second layout so that the first subject and the second subject are displayed on the display within a pre-defined size ratio range.

8. The electronic device of claim 1, wherein adjusting at least one of the displayed first layout and the displayed second layout further comprises:
comparing a first size of the first subject with a second size of the second subject; and
applying a zoom function to at least one of the first preview image and second preview image or at least one of the first camera and second camera so that the first subject and second subject are displayed on the display within a pre-defined size ratio range.

9. A method of displaying images comprising:
activating a plurality of cameras;
receiving a first preview image of a first subject from a first camera and a second preview image of a second subject from a second camera;
displaying, on a display, the first preview image in a first layout and the second preview image in a second layout, wherein the first subject corresponds to a first focusing area and the second subject corresponds to a second focusing area;
adjusting at least one of the displayed first layout and the displayed second layout according to attributes of the first subject, the first focusing area, the second subject, and the second focusing area;
tracking at least one the first subject on the first preview image and the second subject on the second preview image;
determining if the first subject is out of a viewing range of the first camera or if the second subject is out of a viewing range of the second camera;
if the first subject is out of a viewing range of the first camera, terminating a display of the displayed first preview image and the first layout;
if the second subject is out of a viewing range of the second camera, terminating a display of the displayed second preview image and the second layout;
detecting whether a single subject is duplicated as the first subject and the second subject on the display; and
when the single subject is duplicated, terminating display of one of the first layout and the second layout so that the single subject is no longer duplicated on the display.

10. The method of claim 9, wherein adjusting at least one of the displayed first layout and the displayed second layout further comprises:
detecting at least one of a size and a position of the first focusing area and the second focusing area, and
altering at least one of the size or the position of the at least one of the displayed first and second layouts so that the focusing areas do not overlap.

11. The method of claim 10, wherein altering the at least one of the displayed first and second layouts further comprises altering a position of at least one of the first subject within the first layout and the second subject within the second layout so that the first focusing area does not overlap the second focusing area.

12. The method of claim 9, wherein the first subject and the second subject comprise a face shape of a human.

13. The method of claim 9, wherein adjusting at least one of the displayed first layout and the displayed second layout further comprises:
   in response to detecting a particular subject entering into a viewing angle of an activated camera of the plurality of cameras, displaying a new layout corresponding to a preview image captured by the activated camera including the particular subject.

14. The method of claim 9, wherein adjusting at least one of the displayed first layout and the displayed second layout further comprises:
   comparing a first size of the first subject with a second size of the second subject; and
   adjusting at least one of the first size and the second size so that the first subject and the second subject are displayed on the display within a pre-defined size ratio.

15. The method of claim 9, wherein adjusting at least one of the displayed first layout and the displayed second layout further comprises:
   comparing a first size of the first subject with a second size of the second subject; and
   adjusting a size of at least one of the first layout and the second layout so that the first subject and the second subject are displayed on a display within a pre-defined size ratio range.

16. The method of claim 9, wherein adjusting at least one of the displayed first layout and the displayed second layout further comprises:
   comparing a first size of the first subject with a second size of the second subject; and
   applying a zoom function to at least one of the first preview image and second preview image or at least one of the first camera and second camera so that the first subject and the second subject are displayed on a display within a pre-defined size ratio.

* * * * *